US007000111B1

(12) United States Patent
Dent et al.

(10) Patent No.: US 7,000,111 B1
(45) Date of Patent: Feb. 14, 2006

(54) METHOD FOR MASKING SECRET MULTIPLICANDS

(75) Inventors: Paul W. Dent, Pittsboro, NC (US); Michael Kornby, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 830 days.

(21) Appl. No.: 09/707,702

(22) Filed: Nov. 7, 2000

(51) Int. Cl.
*H04L 9/00* (2006.01)

(52) U.S. Cl. ...................... 713/174; 713/193; 713/322; 713/323; 713/501; 380/28; 380/46; 380/47; 380/29; 380/262; 380/263; 380/268; 708/491; 235/492; 235/375; 235/380; 235/382; 235/487

(58) Field of Classification Search ............... 713/174, 713/193, 322, 323, 501; 380/28, 46, 47, 380/1, 29, 262, 263, 268; 708/491; 235/492, 235/375, 380, 382, 487

See application file for complete search history.

(56) References Cited

U.S. PATENT DOCUMENTS

| 6,298,135 | B1 * | 10/2001 | Messerges et al. | ............. | 380/1 |
| 6,327,661 | B1 * | 12/2001 | Kocher et al. | ............... | 713/193 |
| 6,408,075 | B1 * | 6/2002 | Ohki et al. | ................... | 380/28 |
| 6,419,159 | B1 * | 7/2002 | Odinak | ........................ | 235/492 |
| 6,724,894 | B1 * | 4/2004 | Singer | ........................ | 380/28 |

FOREIGN PATENT DOCUMENTS

| GB | 2345229 A | | 6/2000 |
| GB | 2345229 A | * | 6/2000 |
| WO | WO99 63696 | | 12/1999 |

OTHER PUBLICATIONS

Kömmerling, Oliver et al. *Design Principles for Tamper-Resistant Smartcard Processors*, n.d. Advanced Digital Security Research, Mühlstrasse 7, 66484 Riedelberg, Germany.

Messerges, Thomas S., et al., "Power Analysis Attacks of Modular Exponentiation in Smartcards," Cryptographic Hardware and Embedded Systems, International Workshop, Aug. 1999, pp. 144-157.

Coron, J.S., "Resistance Against Differential Power Analysis for Elliptic Curve Cryptosystems," Cryptographic Hardware and Embedded Systems, International Workshop, Aug. 1999, pp. 292-302.

* cited by examiner

Primary Examiner—Ayaz Sheikh
Assistant Examiner—Shin-Hon Chen
(74) Attorney, Agent, or Firm—Coats & Bennett, P.L.L.C.

(57) ABSTRACT

A mobile terminal for use in a mobile communications system includes a SIM card storing subscriber related data. For security, the SIM card performs secret cryptographic calculations with secret numbers. Secret information is hidden from outside observation by scheduling the calculations using a precomputed, fixed randomization schedule in such a way that externally observable parameters of the device cannot be associated to particular pieces, bits, symbols or values of the secret information.

20 Claims, 2 Drawing Sheets

METHOD FOR MASKING SECRET MULTIPLICANDS

FIELD OF THE INVENTION

The invention relates to implementation of public/private key encryption in tamper-proof chips.

Certain wireless mobile communications systems, such as the global system for mobile communications (GSM) uses a removable subscriber identity module (SIM), also referred to as a "smart card". The SIM stores various subscriber related data, such as an IMSI value, which is referred to in the GSM system as an international mobile subscriber identity. The SIMs are conventionally pre-programmed to include the IMSI. Thus, a mobile communications system operator typically purchases a supply of SIMs. The mobile terminals themselves do not include information that identifies the subscriber. Instead, the mobile station is a shell until the SIM is installed. The SIM can be removed from one mobile terminal and inserted in a new mobile terminal. This enables the new mobile terminal to be used immediately. This also renders the SIM open to attacks to the stored data. Therefore, security methods, such as public/private key encryption can be used to secure the stored data.

Public/private key encryption methods are based on the identity $$|X^Z|_N = X,$$

where the modulus N is the product of two secret primes P1, P2 and Z is equal to M(P1-1)(P2-1)+1 and M is arbitrary.

Z is factorized into the product of a private key Kpriv and a public key Kpub. Many pairs of these can be found by choosing different values of M. Kpub is published and may be used by another party to send messages, which can only be deciphered by the recipient using Kpriv.

The known RSA algorithm enciphers blocks of bits at a time, which, viewed as a binary number X, must have an arithmetic value less than the given modulus N. Encryption is accomplished by raising X to the power Kpub, and reducing it modulo-N. Decryption does the same using Kpriv to reproduce X. All such operations necessarily produce a result less than N.

Another use of the public/private key pair is for signing messages to prove they were sent by a particular party. The party then encrypts the message using Kpriv and any party can decipher it with Kpub, and will obtain a sensible result only if the message was encrypted using the senders secret private key Kpriv.

When both encryption and signing are required, the message is signed using the sender's private key Kpriv1 and modulus N1 and then ciphered using the recipient's public key Kpub2 and modulus N2. The recipient replies in the same way using Kpriv2 and Kpub1, and the moduli N1 and N2 reversed.

In both cases, during either signing a message to be transmitted or deciphering a message received, a computational circuit is required to raise a large binary number to the power of Kpriv without releasing or betraying Kpriv to the world outside a secure, tamper-proof circuit.

Reference is made to Bruce Schneier's book "Applied Cryptography" (John Wiley and Sons, 1994) for further understanding of the prior art. This book is hereby incorporated by reference herein in its entirety.

Two main algorithms are known for reducing the effort in raising a number as large as 2048 bits to a power that can be a number almost as long in bits, and reducing it modulo another large number.

If the power Kpriv is a bitstring $B_n, B_{n-1} \ldots B_3, B_{2,1} B_1$, then X raised to this power is given by Z=1 times X (if B1=1)
   times $X^2$ (if B2=1)
   times $X^4$ (if B3=1)
. . .
. . .

and so forth.

Thus successive squares $x, x^2, (x^2)^2 \ldots$ are formed, and either multiply the Z-accumulator or not depending if a corresponding bit is 1 or 0. Thus the number of numbers that have to be multiplied to form Z is only of the order of 2048 instead of $2^{2048}$, which would be impractical. This successive squaring algorithm is vital in rendering such calculations tractable.

After each multiplication or squaring, which increases—the original word length from 2048 to 4096 bits, the word length is decreased back to 2048 bits by reducing the result modulo-N. This requires subtracting a number of multiples of N until the result is less than N. The number of multiples of N which have to be subtracted is of the order of two to the power 2048 or $10^{600}$ which clearly eliminates the possibility of successive subtraction. Instead, since the modulus (N) is fixed for a long time, its approximate reciprocal may be computed to 2048 significant bits, ignoring leading zeros after the binary point, and stored as 1/N (approximately). Then each time a 4096-bit Z value is to be reduced modulo-N, the approximate number of times N would have to be subtracted is calculated from $T=Z \times (1/N)$ which is just a single long multiplication of Z with the stored approximate reciprocal. T times N is then subtracted from Z which will be found to have reduced it to within one or two times N of the required result. The reduction is completed by subtracting N one or two times more from Z until the remainder is less than N but not negative. This modulo-reduction algorithm thus requires about two long multiplications and two subtractions instead of $10^{600}$ successive subtractions, and is also vital to render such calculations possible.

Other computation reduction algorithms take advantage of the fact that a squaring operation can be performed faster than a multiplication of two different quantities, as the same partial products occur twice and need only be calculated once.

The pattern of calculation when employing these algorithms in a common fashion is thus:

1. Load X into the Z accumulator (Assuming Kpriv is odd so B1=1, else set Z=1)
2. Square X and reduce modulo-N
3. If B2=1, multiply the new value of X into the Z accumulator and reduce Z modulo-N
4. Repeat from step 2 using successively B3, B4, B5 etc. at step 3 until done.

In the above, the duration of one iteration of the loop depends on whether or not the conditional multiplication was performed at step 3. Therefore by observing whether the iteration was a short one or a long one by measuring power consumption profiles external to the circuit, it can be determined whether each value B2, B3, B4 was a one or a zero and therefore determine the secret value Kpriv. In the prior art of cipher systems, such inadvertent leakage of secret information was termed a "TEMPEST" hazard after the acronym for the Government testing standards against which cipher equipment was tested. The problem was solved in the prior art of cipher systems by inclusion of special "RED" power supplies that maintained the same power consumption irrespective of the circuit activity, for example by the use of a shunt regulator. However, in this prior art the RED power supplies were separate and not an integrated part of the cipher chips, as it was assumed that the threat did not have physical access to internal nodes of the equipment. However, if the cryptographic circuits are located on a removable card such as a SIM that is inserted into mobile terminals, then it is assumed that an ill-intentioned person might sometime gain access to the SIM connections.

There is thus a need for a circuit and method which can raise large numbers to a large power without inadvertently betraying the power through a TEMPEST leak.

PCT publication number WO 99/63696 describes the incorporation of a random number generator or noise source to randomize the timing of calculations so that power profile is not so obviously correlated with secret information. The above PCT application is hereby incorporated by reference herein. This technique is not completely effective however, as multiple observations can be made to determine the shortest delay between different power profile patterns, which presumably correspond to the addition of zero or small random delay. Therefore there is a need for improved methods to conceal the nature of internal calculations with secret information.

SUMMARY OF THE INVENTION

The above needs are met in a computational device for performing secret cryptographic calculations with secret numbers, using a method of hiding secret information from outside observation by scheduling the calculations using a precomputed, fixed randomization of the schedule in such a way that externally observable parameters of the device cannot be associated to particular pieces, bits, symbols or values of the secret information.

DETAILED DESCRIPTION OF THE INVENTION

Figure 1:
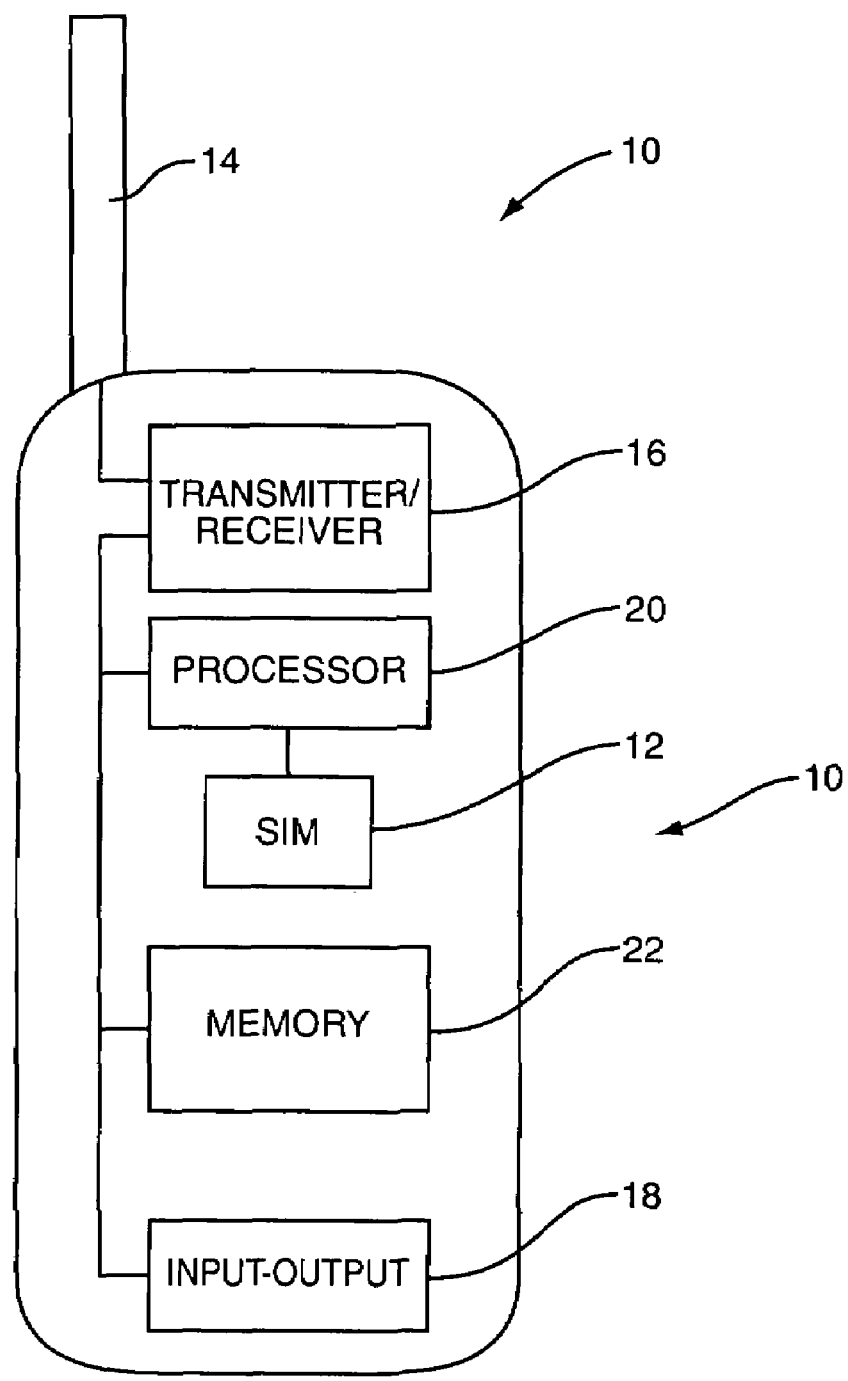
FIG. 1 is a generalized block diagram illustrating a mobile terminal having a SIM implementing cryptographic calculations in accordance with the method of the present invention.

Referring to FIG. 1, a mobile terminal 10 is illustrated in block diagram form. In the illustrated embodiment of the invention, the mobile terminal 10 comprises a GPRS-136HS mobile terminal. This type of mobile terminal 10 is used in a time-division multiple access (TDMA) mobile communications system network. The mobile terminal 10 includes a subscriber identity module (SIM) 12 also known as a SIM card or smart card. The SIM card 12 is generally similar to SIM cards used in global system for mobile communications (GSM) systems which contains unique subscriber information. In accordance with the invention, a method is disclosed for masking secret multiplicands used for public/private key encryption for the mobile terminal 10 including the SIM card 12. While the method is described in connection with a mobile terminal used in a TDMA system, the inventive method could be used in other types of mobile communications systems, including a code-division multiple access (CDMA) system, such as IS95 or Universal Mobile Telephone System (UMTS).

The mobile terminal 10 includes an antenna 14 for sending and receiving through-the-air radio signals between itself and a mobile communications system network. The antenna 14 is connected to a transmitter/receiver 16 to broadcast and receive on the same antenna 14. Particularly, the transmitter/receiver 16 includes a receiver that demodulates, de-multiplexes, and decodes the radio signals into one or more channels. Such channels include a control channel and a traffic channel for speech or data. The speech or data are delivered to an output device of an input-output circuit 18, such as a speaker. The receiver delivers messages from the control channel to a processor 20. The processor 20 controls and coordinates the functioning of the mobile terminal 10 responsive to messages on the control channel using programs and data stored in a memory 22 and the SIM card 12 so that the mobile terminal 10 can operate within the mobile communications system network. The processor 20 also controls the operation of the mobile station 10 responsive to input from the input-output circuit 18. This input may utilize a keypad or the like as a user-input device and a display to give the user information, as is well known. The transmitter/receiver 16 also includes a transmitter that converts analog electrical signals into digital data, encodes the data with error-detection and correction information, and multiplexes this data with control messages from the processor 20. This combined data is modulated and broadcast via radio signal through the antenna 14, as is conventional. The memory 22, in accordance with the invention, stores information relating to the capabilities of the mobile terminal 10 as well as information personalized to the particular mobile communications system network operator.

The present invention is described herein in the context of a mobile terminal. As used herein, the term "mobile terminal" may include a mobile communications radiotelephone with or without a multi-line display; a Personal Communications System (PCS) terminal that may combine a mobile communications radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

Figure 2:
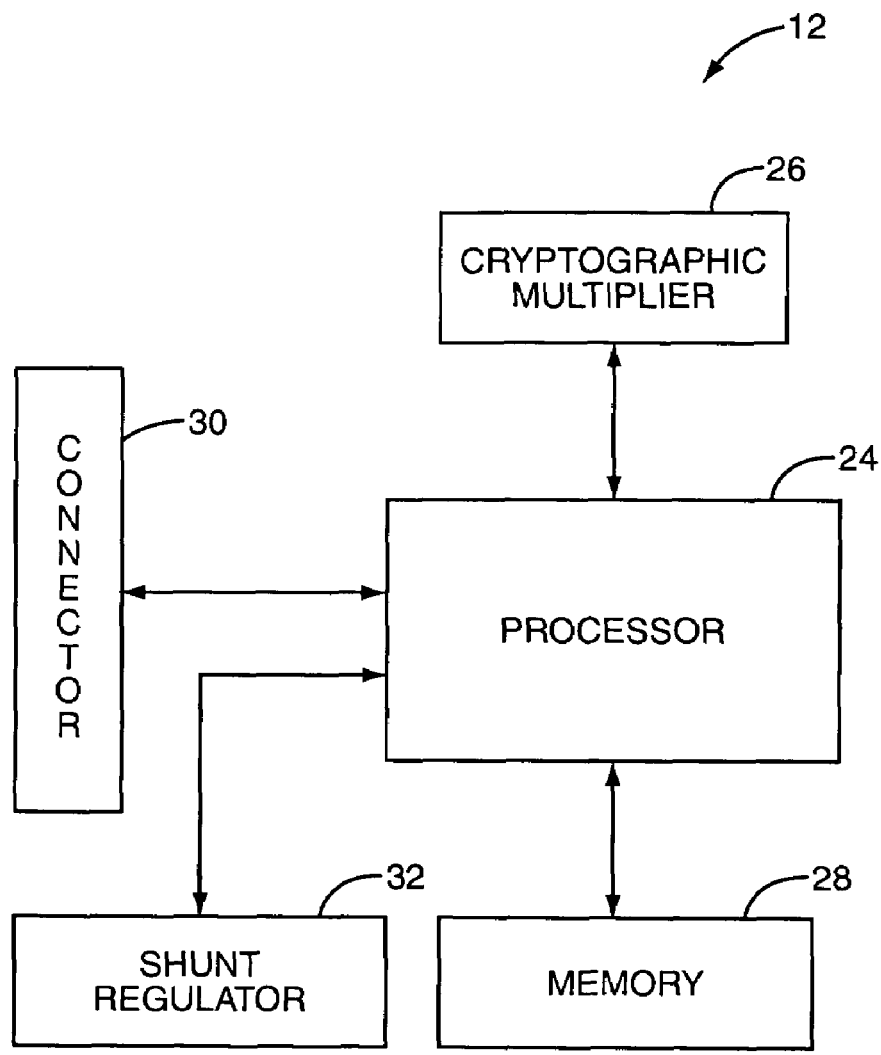
FIG. 2 is a block diagram of the SIM of FIG. 1.

The SIM card 12 stores subscriber related data. In accordance with the invention, the SIM card 12 is configured as a tamper-proof device for performing discrete exponentiations, modulo a very large number. Referring to FIG. 2, the SIM card 12 comprises a control processor 24, a multiplier 26 for accelerating cryptographic calculations, and memory 28, and is covered by an upper metallization layer (not shown) to prevent probing internal nodes for the illicit purpose of extracting stored secret information, and in particular a private key that is often used as an exponent. The processor 24 is connected to an input/output interface connector 30 for operative connection to the mobile terminal processor 20, see FIG. 1. The connector 30 enables subscriber data to be stored on the SIM card 12 and for data to be transferred between the processors 24 and 20. When the private key is used as the exponent to exponentiate a large number, the large number is successively squared and the result either multiplies an accumulator, if the corresponding bit of the private key equals 1, or not if the bit is 0. In the prior art, observation of the power supply current profile external to the tamper-proof chip could betray whether a multiplication with the accumulator took place or not and thereby reveal the bits of the private/secret key. The chip therefore also preferably comprises a shunt regulator 32 to ensure, as far as possible, that the current consumption of the chip in the middle of a calculation period is held approximately constant and independent of the values calculated. Nevertheless, small externally observable changes such as magnetic fields may still betray internal activity.

Particularly, the SIM card 12 comprises a tamper-proof computational device. The connector 30 comprises an input/output interface. The memory 28 stores secret information in the form of, for example, the subscriber related data. The processor 24 is programmed for performing secret cryptographic calculations. These calculations use secret numbers, such as the private key and hide the stored secret information from outside observation by scheduling the cryptographic calculations using a precomputed, fixed randomization schedule in such a way that externally observable parameters cannot be associated to particular pieces, bits, symbols or values of the secret information.

In one implementation, the invention comprises the processor 24 and the cryptographic multiplier 26 performing a small number of false multiplications, the results of which are sent to a "waste basket" or at least do not replace the old accumulator value, when a multiplication with the accumulator would ordinarily not have been performed. For example, if the key is a 1500 bit number having typically 750 1's and 750 0's, inserting 25 false multiplications at random where there is a zero only increases execution time by 3%. However, attempting to extract the private key then involves determining which 25 out of 750 multiplications were false, which requires $^{750}C_{25}$ trials, an impossibly big number.

In another implementation, successive squares with modulo-reduction are performed a small number of times, for example eight, and the results stored in eight memory locations. Then the first byte of the private key is used to determine which of the eight values to multiply with the accumulator, according to whether a 1 is in the corresponding bit position of the byte. As each value is multiplied, the corresponding bit in the byte is set to zero, and a new successive square is then computed and overwrites the square just used in the eight memories. If the bit is zero and a square is not used, a successive square is performed anyway and overwrites the square not used. When the bits of the byte have all been tested, the next most significant byte of the private key is fetched and the process continues. By so interlacing the computation of successive squares, whether or not they are used to multiply the accumulator, it is difficult to determine which of the precomputed terms were used in multiplication.

In a third implementation, at the time the private key Kpriv is generated it is partitioned into three values K1, K2, K3 such that K1·K2+K3=Kpriv, each being of half the word length of Kpriv, and furthermore such that the total number of 1's in K1, K2 and K3 together is minimized and smaller than the total number of 1's in Kpriv. When a value is to be exponentiated with Kpriv, successive squares are formed as before and multiplied to two accumulators according to the bits of K1 and K3 respectively thus forming the value raised to the power K1 as Z1 and the value raised to the power K3 as Z3. The value Z1 is then further raised to the power K2 by successively squaring Z1 and accumulatively multiplying the successive squares (or not) dependent on if a bit of K2 is a 1, or 0, to obtain Z2. Finally, the product of Z2 and Z3 is formed and modulo-reduced to produce the desired result.

Any combination of the above three methods may also be used to eliminate the correlation between power profile and secret information usage.

The essential algorithms for performing public key cryptographic calculations and their deficiencies were described above. To mask internal activity in cipher circuits, it was already known in the prior art to employ special "RED" power supplies to keep externally observable current consumption fluctuations to a minimum. Such a power supply can comprise a constant current source to draw a constant current from the supply, followed by a shunt voltage regulator which bypasses current to ground that is not instantaneously consumed. It may be difficult to fully integrate an effective RED supply on to a tamper-proof chip, such as on a SIM card, however, because the current source needs to supply the peak current drain on a continuous basis; unless averaged by a substantial capacitor. However, the peak current drawn by high speed logic circuits can be very large. There is a limit to how well such analog components as current sources, shunt regulators and smoothing capacitors can be integrated with a logic circuit, and so this invention discloses other means and methods to mask internal activity of logic circuits. The invention also seeks to mask deducing secret information by observing any other externally observable parameter of the circuit, such as the timing of output signals from the device.

In order to mask the bits of the secret key, a first implementation of the invention comprises modifying the sequence of calculations implemented in the SIM card processor 24 to mask the secret multiplicands by inserting a small percentage of additional multiplications as follows:

1. Load X (or 1) into the Z accumulator according as B1=1 or 0, and into a dummy accumulator Z'
2. Square X and reduce modulo-N
3. (a) If B2=1, multiply the new value of X into the Z accumulator and reduce Z modulo-N, else
   (b) If B2=0 but a randomizing indicator is set, multiply the new value of X with Z (or Z') and reduce modulo-N, but store the result in the dummy location Z'
4. Repeat from step 2 using successively B3,B4,B5 etc at step 2 until done.

When the randomizing indicator is set, a loop iteration that would otherwise have been short, due to a bit of Kpriv being zero, is lengthened to the same length as if Kpriv had been 1. A loop iteration for which the corresponding bit of Kpriv equals 1, is however always long. Therefore, if the randomizing indicator were different on different occasions when Kpriv was used, as in PCT patent WO 99/63696, observing those loop iterations that were always long and those loops that were sometimes short on different occasions would still betray the value of Kpriv. Therefore according to this invention, the randomizing indicator bits must always be the same and preferably determined once and for all at the time Kpriv is generated. The randomizing indicator is therefore a binary word of the same length as Kpriv, having a binary one, in about one in thirty of the positions where Kpriv has a zero. It is of no consequence if the randomizing word also has 1's where Kpriv has 1's, so the randomizing word of perhaps 2048 bits must just contain about 2048/30, or about 64, binary 1's. The randomizing word can be generated at the time Kpriv is generated by generating a random number between 0 and 2047 to determine the bit address of the randomizing word that shall be set to 1, and repeating this 64 times to place about 64 1's in the word. The randomizing word can then be permanently stored along with Kpriv, and is designated by Krand.

When the above methods are used, it may still be possible to determine which iterations are long and which are short, but the value of Kpriv so betrayed is modified to Kpriv.OR.Krand which has extra 1's in about 32 bit positions where Kpriv had zeroes. It is however impossible to distinguish which 1's are real and which are false. It is not a question of just trying $2^{32}$ possibilities, but, assuming there are in total about 750 1's in the composite value Kpriv.OR.Krand, of testing which 32 out of 750 should really be zeros. Moreover, whether the number of false 1's is exactly 32 is not known for sure, the uncertainty being perhaps between 20 and 60. While the position of nearly all the zeros in Krand may be observed, there is a very large uncertainty remaining in the value of Kpriv.

The second implementation of masking the secret multiplicand by breaking the correlation between power supply current fluctuations and internal computational activity is now disclosed. Since all successive squares of X are computed, it is theoretically possible to compute them all first and store the results in 2048, 2048-bit memories that is in a 4 megabit memory. Then the bits of Kpriv which are 1 are used to select from the memory those 2048-bit values which are to be multiplied. With the reasonable assumption that it is impossible to distinguish selection of one value to multiply the accumulator from another, only the total number of values selected, that is the total number of 1's contained in Kpriv is betrayed, but not their bit positions. To mask the slight difference in current profile timing that might occur as a 0 in Kpriv is skipped, testing the next bit of Kpriv could advantageously be buried in the middle of an ongoing multiplication sequence. For example, if separate multiplication acceleration hardware is employed, the control processor could locate the next 1 in Kpriv and prepare the corresponding address within the 4 megabit memory for the next multiplication in parallel with performing the previous multiplication.

At the present time, a 4 megabit RAM requirement is expensive for the above method, but the method can be applied partially to subgroups of bits of Kpriv as follows:

1. Since Kpriv is almost always odd, multiplication with X is always required and can be initially loaded into the Z-accumulator;
2. Compute 8 successive squares of X and store in 8, 2048-bit locations, numbered 0 to 7, a RAM usage of 2048 bytes;
3. Locate the next most significant 1, in the first byte of Kpriv and multiply Z by the value in the corresponding one of the 8 memories, if the value is available; otherwise continue to step 4;
4. Compute a new successive square of X and store in memory location $|n+1|_8$,
5. Repeat from step 3 using bits from successive bytes of Kpriv until done.

An example of the above calculation sequence is given for the case where Kpriv comprises the bit pattern . . . 111001010010101011010111001

Designating squaring of X by "SQ" and storing of the result in a memory location 'j' by SQ->j, and designating multiplication of the Z-accumulator with the value from storage location 'i' by MPY(i), the following sequence is obtained:

SQ->0
SQ->1
SQ->2
SQ->3
SQ->4
SQ->5
SQ->6
SQ->7
MPY(2) (corresponding to the '1' of Kpriv 4th bit from the right)
SQ->0 (that square was not needed so can be overwritten)
MPY(3)
SQ->1
MPY(4)
SQ->2
MPY(6)
SQ->3
MPY(0) (The '1' in the LSB position of the second byte of Kpriv)
SQ->4
MPY(1)
SQ->5
MPY(3)
SQ->6
MPY(5)
SQ->7
SQ->0 (The next '1' in Kpriv is bit 0 of the third byte and that square was not yet calculated)
MPY (0)
SQ->1
SQ->2 (The next '1' in Kpriv is bit 2 and that square was not yet calculated)
MPY(2)
SQ->3
SQ->4
SQ->5
MPY(5)
SQ->6
MPY(6)
SQ->7
MPY(7)

Assuming that a squaring operation can be detected externally to the circuit to differ from a multiplication operation, it can be detected from the above sequence that eight consecutive multiply/square steps were interrupted a double square step before the next multiply. This betrays the fact that a new value in memory number 0 was needed but was not yet available. Therefore it is detectable that the LSB of the third byte of Kpriv is a 1. It is also evident that the first two bytes of Kpriv contained eight 1's, but their locations are concealed. Unfortunately the next double square also reveals that bit 2 of the third byte of Kpriv is a 1, and the following triple square reveals that bit 5 is a 1, and so forth. To obtain the same level of concealment as for the first 16 bits of Kpriv, the sequence should be modified as follows:

SQ->0
SQ->1
SQ->2
SQ->3
SQ->4
SQ->5
SQ->6
SQ->7
MPY(2) (corresponding to the '1' of Kpriv 4th bit from the right)
SQ->0 (that square was not needed so can be overwritten)
MPY(3)
SQ->1
MPY(4)
SQ->2
MPY(6)
SQ->3

MPY(O) (The '1' in the LSB position of the second byte of Kpriv)
SQ->4
MPY(1)
SQ->5
MPY(3)
SQ->6
MPY(5) At this point the next square needed is not yet calculated; that means that all of the values in the 8 memories are done with and may be overwritten; so 8 new successive squares are calculated
SQ->7
SQ->0
SQ->1
SQ->2
SQ->3
SQ->4
SQ->5
SQ->6
MPY (0)
SQ->7
MPY(2)
SQ->0
MPY(5)
SQ->1
MPY (6)
SQ->2
MPY(7)
SQ->3 At this point let us assume that the next square needed is some way ahead and not yet calculated. Thus all memorized squares are done with and a new 8 may be calculated.
SQ->4
SQ->5
SQ->6
SQ->7
SQ->0
SQ->1
SQ->2

From the above sequence it may be deduced that, after the MPY(5) instruction an MPY(6) instruction was not the next needed multiplication, and therefore that the corresponding bit of Kpriv was a zero. However, the positions of the implied 1's in Kpriv corresponding to the next five MPY instructions:

MPY(O), MPY(2), MPY(5), MPY(6), MPY(7) are concealed, as the sequence could equally well have comprised MPY(1), MPY(2), MPY(3), MPY(5), MPY(7) or MPY(O), MPY(1), MPY(4), MPY(5), MPY(6) or any such combination.

Thus after processing 256 bytes of Kpriv, the numerical uncertainty in its value still remaining is enormous.

The first method of concealment by insertion of a small number of false multiplications can also obviously be combined with the above second method. A variation on the insertion of false multiplications can also be used, which is to convert one of each pair of immediately successive squaring operations from the "efficient" squaring method to the normal long multiplication method applicable to unequal multiplicands, so that a double square operation SQ SQ is not distinguishable from MPY SQ or SQ MPY. Whether the first or the second SQ is so-converted can be random, but predetermined, and the center SQ operation of three in succession would always be converted to a MPY look-alike.

Since the bits of Kpriv are long-term fixed, the above sequences may be predetermined and stored as a preferred instruction sequence that best conceals Kpriv. Since it is desirable that Kpriv never be revealed outside the tamper-proof area, the program to compute these sequences should be stored on the same chip.

In a third implementation, a method of exponentiating by Kpriv is sought which not only helps to conceal its value, but also reduces the effort needed to perform the exponentiation.

It can be advantageous to search for factors of Kpriv first and remove them, as it takes little effort to apply exponentiation by small prime factors at the end. The problem then reduces to one of exponentiating by the remaining value of Kpriv after removing at least small prime factors that can be discovered quickly. The remaining value of Kpriv after removing all the discovered factors, including 2, will of course be odd.

An exemplary 2048-bit odd value Kpriv may be partitioned into three 1024-bit values K1,K2 and K3 such that K1·K2+K3=Kpriv in innumerably different ways, some of which will result in K1, K2 and K3 containing fewer 1's than others.

By choosing a partitioning having a minimum total number of 1's, the effort needed to exponentiate by Kpriv can be reduced with regard to the equation $$X^{kpriv}=(X^{K1})^{K2} \cdot X^{K3}$$

Each of the exponentiations by K1, K3 and K2 requires an effort related to the number of 1's contained in the power and thus the total effort may be reduced if the total number of 1's in K1,K2 and K3 together is less than the number of 1's in Kpriv.

Other partitioning such as $$K1 \cdot K2+K3 \cdot K4=Kpriv$$

could also be used.

Another partitioning option comprises expressing Kpriv as the product of sparse integers K1·K2·K3 . . . plus a remainder R, where $K_i$ is of the form $2^i+1$, and then exponentiating X first by the largest factor and by R simultaneously to form Z1 and Z2, and then successively exponentiating Z1 further by the smaller K-factors, multiplying the final Z1 value by Z2, i.e. computing $X^{R\times(((((XKn)^{Kn-1})\ldots)\ldots)^{K2})^{K1}}$.

The effort required for the latter is related to the number of binary ones in R plus the sum of the binary ones in all the K-factors.

At the time Kpriv is generated, a program can be executed one time only to test various partitions of the above form and to determine a partitioning most efficient for exponentiating by Kpriv. The exact partitioning chosen will not however be known to the outside, so together with the other safeguards disclosed above, the value with which exponentiation is being performed can be hidden from external observers. A person skilled in the art may use the above teachings to implement many variations for hiding the nature of internal calculations or accelerating exponentiation by a very large power, or both, which nevertheless would fall within the scope and spirit of the invention if adhering to the steps described in the attached claims.

The present invention has been described with respect to a block diagram of programmed devices. It will be understood that the functions described relative to each block of the block diagram can be implemented by computer program instructions. These program instructions may be provided to a processor to produce a machine, such that the instructions, which execute on the processor, create means for implementing the functions described relative to the blocks. The computer program instructions may be executed by a processor to cause a series of operational steps to be performed by the processor to produce a computer implemented method such that the instructions which execute on the processor provide steps for implementing the functions specified in the blocks. Accordingly, the illustrations and accompanying disclosure support combinations of means for performing a specified function and combinations of steps for performing the specified functions. It will also be understood that each block and combination of blocks can be implemented by special purpose hardware-based systems that perform the specified functions or steps, or combinations of special purpose hardware and computer instructions.

We claim:

1. A method of thwarting detection of a secret binary number in a cryptographic computational device by analysis of externally observable parameters, comprising:
   conditionally performing a plurality of calculations in response to the bit values of said secret number;
   multiplicatively accumulating the results of said plurality of calculations in a subtotal; and
   performing dummy calculations in response to selected bit positions of said secret number that indicate calculations should not be performed, and not multiplicatively accumulating the results of the dummy calculations in said subtotal, said selected bit positions randomly distributed over a binary indicator equal in length to said secret number;
   whereby said dummy calculations alter at least one externally observable parameter.

2. The method of claim 1 wherein conditionally performing a plurality of calculations in response to the bit values of said secret number comprises performing a calculation where said bit value is a one and not performing said calculation where said bit value is a zero.

3. The method of claim 2 wherein performing dummy calculations in response to selected bit positions of said secret number that indicate calculations should not be performed comprises performing said dummy calculations in response to said secret number bit position being a zero and a corresponding indicator bit position being a one.

4. The method of claim 3 wherein said indicator is fixed.

5. The method of claim 4 wherein said indicator is generated upon first commissioning said device into operation and internally stored such that it is never released outside said device.

6. The method of claim 1 further comprising generating said secret number upon first commissioning said device into operation and internally storing said secret number such that it is never released outside said device.

7. The method of claim 1 in which said externally observable parameters include variation in power supply current.

8. The method of claim 1 in which said externally observable parameters include variation in timing of outputting results of said calculations.

9. The method of claim 1 wherein conditionally performing a plurality of calculations and accumulating their results calculates the exponentiation of a long integer to the power of a large secret exponent.

10. The method of claim 9 in which calculating the exponentiation of a long integer to the power of a large secret exponent comprises selectively calculating successive squares of said long integer and multiplicatively accumulating said squares in response to the bit values of said secret exponent, and reducing said accumulated value modulo a given modulus.

11. A detection-proof computational device comprising:
an input/output interface;
a memory storing a secret binary number; and
a processor operatively connected to said input/output interface and to said memory and programmed for cryptographic computation using said secret binary number while thwarting detection of said secret binary number by analysis of externally observable parameters, the cryptographic computation comprising:
   conditionally performing a plurality of calculations in response to the bit values of said secret number;
   multiplicatively accumulating the results of said plurality of calculations in a subtotal; and
   performing dummy calculations in response to selected bit positions of said secret number that indicate calculations should not be performed, and not multiplicatively accumulating the results of the dummy calculations in said subtotal, said selected bit positions randomly distributed over a binary indicator equal in length to said secret number;
   whereby said dummy calculations alter at least one externally observable parameter.

12. The device of claim 11 in which in which said externally observable parameters include variation in power supply current.

13. The device of claim 11 in which said externally observable parameters include variation in timing of outputting results of said calculations.

14. The device of claim 11 wherein said secret cryptographic computations comprise exponentiating a long integer to the power of a large secret exponent.

15. The device of claim 14 wherein exponentiating a long integer to the power of a large secret exponent comprises selectively calculating successive squares of said long integer and multiplicatively accumulating said squares in response to the bit values of said secret exponent, and reducing said accumulated value modulo a given modulus.

16. A mobile terminal used in a mobile communications system comprising:
   a transmitter and a receiver for communicating in the mobile communications system;
   a controller controlling operation of the transmitter and the receiver; and
   a secure device removably, operatively connectable to the controller and comprising:
      an input/output interface;
      a memory storing a secret binary number; and
      a processor operatively connected to said input/output interface and to said memory and programmed for cryptographic computation using said secret binary number while thwarting detection of said secret binary number by analysis of externally observable parameters, the cryptographic computation comprising:
         conditionally performing a plurality of calculations in response to the bit values of said secret number;
         multiplicatively accumulating the results of said plurality of calculations in a subtotal; and
         performing dummy calculations in response to selected bit positions of said secret number that indicate calculations should not be performed, and not multiplicatively accumulating the results of the dummy calculations in said subtotal, said selected bit positions randomly distributed over a binary indicator equal in length to said secret number;

whereby said dummy calculations alter at least one externally observable parameter.

17. The mobile terminal of claim 16 in which in which said externally observable parameters include variation in power supply current.

18. The mobile terminal of claim 16 in which said externally observable parameters include variation in timing of outputting results of said calculations.

19. The mobile terminal of claim 16 wherein said secret cryptographic computations comprise exponentiating a long integer to the power of a large secret exponent.

20. The mobile terminal of claim 19 wherein exponentiating a long integer to the power of a large secret exponent comprises selectively calculating successive squares of said long integer and multiplicatively accumulating said squares in response to the bit values of said secret exponent, and reducing said accumulated value modulo a given modulus.

* * * * *